(12) United States Patent
Kim et al.

(10) Patent No.: US 8,462,672 B2
(45) Date of Patent: Jun. 11, 2013

(54) METHOD OF COMMUNICATING ACCORDING TO TIME DIVISION DUPLEX

(75) Inventors: Dong Cheol Kim, Seoul (KR); Min Seok Noh, Seoul (KR); Yeong Hyeon Kwon, Seoul (KR); Jin Sam Kwak, Seoul (KR); Sung Ho Moon, Seoul (KR); Seung Hee Han, Seoul (KR); Hyun Woo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 12/936,385

(22) PCT Filed: Apr. 23, 2009

(86) PCT No.: PCT/KR2009/002137
§ 371 (c)(1),
(2), (4) Date: Oct. 4, 2010

(87) PCT Pub. No.: WO2009/131396
PCT Pub. Date: Oct. 29, 2009

(65) Prior Publication Data
US 2011/0032855 A1    Feb. 10, 2011

Related U.S. Application Data

(60) Provisional application No. 61/047,403, filed on Apr. 23, 2008.

(30) Foreign Application Priority Data

Apr. 21, 2009  (KR) .................. 10-2009-0034592

(51) Int. Cl.
*H04L 5/14* (2006.01)
*H04J 3/00* (2006.01)

(52) U.S. Cl.
USPC ........................... 370/280; 370/294

(58) Field of Classification Search
None
See application file for complete search history.

(56) References Cited

U.S. PATENT DOCUMENTS

| | | | |
|---|---|---|---|
| 7,426,680 B2 * | 9/2008 | Hwang et al. ................. | 714/790 |
| 8,139,537 B2 * | 3/2012 | Marks et al. .................. | 370/330 |
| 2002/0141355 A1 | 10/2002 | Struhsaker et al. | |
| 2006/0140156 A1 | 6/2006 | Hayashi et al. | |
| 2007/0258422 A1 | 11/2007 | Herrmann | |
| 2008/0187005 A1 * | 8/2008 | Chauviere et al. ............ | 370/480 |
| 2009/0073922 A1 * | 3/2009 | Malladi et al. ................ | 370/328 |
| 2010/0054161 A1 * | 3/2010 | Montojo et al. .............. | 370/280 |
| 2010/0124184 A1 * | 5/2010 | Dayal et al. .................. | 370/280 |
| 2010/0278083 A1 * | 11/2010 | Kwak et al. .................. | 370/280 |
| 2011/0032853 A1 * | 2/2011 | Moon et al. .................. | 370/280 |
| 2011/0044215 A1 * | 2/2011 | Kim et al. ..................... | 370/280 |
| 2012/0040691 A1 * | 2/2012 | Han et al. .................. | 455/456.1 |
| 2013/0042165 A1 * | 2/2013 | Myung et al. ................. | 714/779 |

* cited by examiner

*Primary Examiner* — Min Jung
(74) *Attorney, Agent, or Firm* — Lee, Hong, Degerman, Kang & Waimey

(57) ABSTRACT

The present invention provides a method of performing communication using a TDD (Time Division Duplex) mode, the method comprising receiving, from a second system, TDD frame configuration information of the second system, which comprises information on punctured symbol, the information on punctured symbol to be obtained based on TDD frame configuration information of a first system and operating based on the received TDD frame configuration information of the second system.

9 Claims, 6 Drawing Sheets

METHOD OF COMMUNICATING ACCORDING TO TIME DIVISION DUPLEX

CROSS-REFERENCE TO RELATED APPLICATIONS

This application is the National Stage filing under 35 U.S.C. 371 of International Application No. PCT/KR2009/002137, filed on Apr. 23, 2009, which claims the benefit of earlier filing date and right of priority to Korean Application No. 10-2009-0034592, filed on Apr. 21, 2009, and also claims the benefit of U.S. Provisional Application Ser. No. 61/047,403, filed on Apr. 23, 2008, the contents of which are all hereby incorporated by reference herein in their entirety.

TECHNICAL FIELD

The present invention relates to wireless communication and, more particularly, to coexistence between heterogeneous Time Division Duplex (TDD) systems in a wireless communication system of a TDD scheme.

BACKGROUND ART

Wireless communication systems are being widely deployed in order to provide various kinds of communication services, such as voice or data. In general, a wireless communication system is a multiple access system which can support communication with multiple users by sharing available radio resources (bandwidth, transmission power, etc.). The multiple access systems may include, for example, a Time Division Multiple Access (TDMA) system, a Code Division Multiple Access (CDMA) system, a Frequency Division Multiple Access (FDMA) system, an Orthogonal Frequency Division Multiple Access (OFDMA) system, and a Single Carrier Frequency Division Multiple Access (SC-FDMA) system.

The IEEE (Institute of Electrical and Electronics Engineers) 802.16 standard provides technologies and protocols for supporting broadband wireless access. IEEE 802.16-2001 had been standardized since 1999 and was approved in 2001. The IEEE 802.16-2001 is based on a single carrier physical layer called 'WirelessMAN-SC.' In the IEEE 802.16a standard approved in 2003, 'WirelessMAN-OFDM' and 'WirelessMAN-OFDMA' other than 'WirelessMAN-SC' were further added to the physical layer. After the IEEE 802.16a standard was completed, a revised IEEE 802.16-2004 standard was approved in 2004. In order to modify bugs and error of the IEEE 802.16-2004 standard, IEEE 802.16-2004/Cor1 was completed in 2005 in the form of 'corrigendum.' A standard specification based on the IEEE 802.16-2004/Cor1 is called IEEE 802.16e or WiMAX.

Today, in the IEEE 802.16 Broadband Wireless Access Working Group, the standardization of an IEEE 802.16m standard (i.e., a new technology standard) is being performed on the basis of the IEEE 802.16e. The IEEE 802.16m standard requires supporting flexibly not only new systems, but the existing IEEE 802.16e standard. The IEEE 802.16m system is based on TDD. That is, uplink transmission and downlink transmission are performed in the same frequency band at different point of times.

As a variety of wireless communication systems are deployed, coexistence between heterogeneous systems becomes problematic. In other words, heterogeneous systems provide services in the same region and time. In particular, in order for heterogeneous TDD systems to coexist, it is important that downlink transmission and uplink transmission are not performed at the same time. If downlink transmission and uplink transmission overlap with each other between the heterogeneous TDD systems, data loss may occur because of interference.

DISCLOSURE OF INVENTION

Technical Problem

Accordingly, it is an object of the present invention to provide a communication method, which heterogeneous TDD systems can coexist.

Technical Solution

According to an embodiment of the present invention, there is provided a method of performing communication using a TDD (Time Division Duplex) mode, the method comprising receiving, from a second system, TDD frame configuration information of the second system, which comprises information on punctured symbol, the information on punctured symbol to be obtained based on TDD frame configuration information of a first system and operating based on the received TDD frame configuration information of the second system.

The information on punctured symbol may comprise information on position and number of punctured OFDMA symbols among a plurality of OFDMA symbols constituting a downlink subframe or an uplink subframe.

The TDD frame configuration information of the second system further may comprise information on a ratio of downlink subframes to uplink subframes within a TDD frame.

The TDD frame configuration information of the second system may be received via a control channel.

The control channel may be a SFH (Superframe Header).

According to another embodiment of the present invention, there is provided a method of performing a communication using a TDD (Time Division Duplex) mode, the method comprising obtaining, from a first system, TDD frame information of the first system, configuring TDD frame configuration information of a second system, which comprises information on punctured symbol based on the obtained TDD frame information of the first system and transmitting, to a user equipment, the TDD frame configuration information of the second system.

The method may further comprises obtaining, from the first system, the TDD frame configuration modification information of the first system, reconfiguring the TDD frame configuration information of the second system based on the obtained TDD frame configuration modification information of the first system and transmitting, to the user equipment, the reconfigured TDD frame configuration information of the second system.

The TDD frame configuration modification information of the first system may comprise information on a CP (Cyclic Prefix) length of a TDD frame of the first system, or information on a ratio of a downlink domain to an uplink domain.

The first system may be a 3GPP (3rd Generation Partnership Project) LTE (Long Term Evolution) system or a LCR (Low Chip Rate) system, and the second system is an IEEE (Institute of Electrical and Electronics Engineers) 802.16m system.

Advantageous Effects

In the case where heterogeneous systems using different types of TDD frames coexist, uplink transmission and downlink transmission between the heterogeneous systems are not overlapped with each other. Accordingly, interference can be prevented.

MODE FOR THE INVENTION

Figure 1:
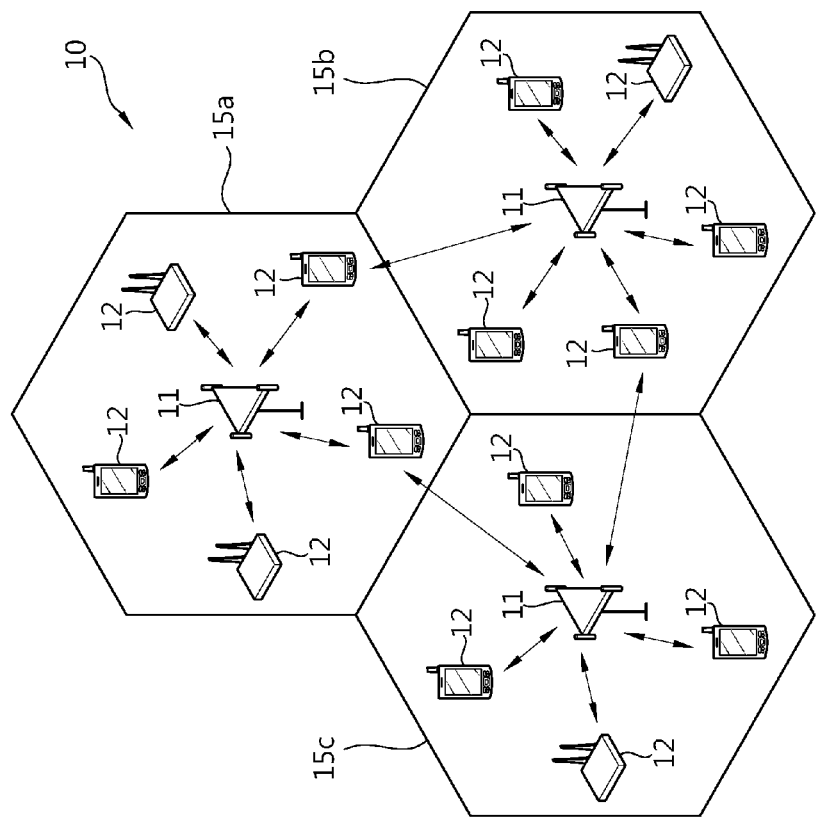
FIG. 1 shows a wireless communication system.

FIG. 1 shows a wireless communication system. The wireless communication system 10 includes one or more Base Stations (BSs) 11. The BSs 11 provide communication services to respective geographical areas (generally called cells) 15a, 15b, and 15c. Each of the cells may be divided into a plurality of areas (called sectors). A User Equipment (UE) 12 may be fixed or mobile and may be referred to as another terminology, such as a Mobile Station (MS), a User Terminal (UT), a Subscriber Station (SS), a wireless device, a Personal Digital Assistant (PDA), a wireless modem, or a handheld device. The BS 11 generally refers to a fixed station which communicates with the UEs 12 and may be referred to as another terminology, such as an evolved-NodeB (eNB), a Base Transceiver System (BTS), or an access point.

Hereinafter, downlink (DL) refers to communication from the BS to the UE, and uplink (UL) refers to communication from the MS to the BS. In downlink, a transmitter may be part of the BS and a receiver may be part of the UE. In uplink, a transmitter may be part of the UE and a receiver may be part of the BS.

In order to clarify a description, a case where an IEEE 802.16m system and a 3GPP (3rd Generation Partnership Project) LTE (long term evolution) system coexist is described as an example. The IEEE 802.16m system has been evolved from an IEEE 802.16e system. The 3GPP LTE is part of E-UMTS (Evolved UMTS) using E-UTRAN and is configured to adopt OFDMA (Orthogonal Frequency Division Multiple Access) in downlink and SC-FDMA (single carrier frequency division multiple access) in uplink. For convenience of description, it may be assumed that the LTE system is a first system and the IEEE 802.16m system is a second system.

Figure 2:
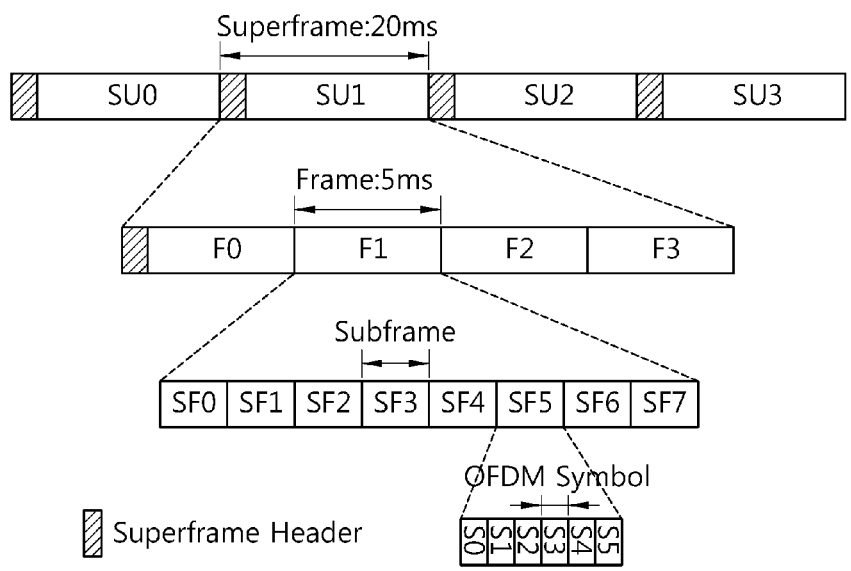
FIG. 2 shows a frame format of an IEEE 802.16m system.

FIG. 2 shows a frame format of the IEEE 802.16m system.

Referring to FIG. 2, a superframe includes a superframe header (SFH) and four frames F0, F1, F2, and F3. It is illustrated that the size of each superframe is 20 ms and the size of each frame is 5 ms, but the present invention is not limited to the above. If OFDMA parameters listed in the following Table 2 are used, each frame includes eight subframes SF0, SF1, SF2, SF3, SF4, SF5, SF6, and SF7. Each subframe may be used for uplink or downlink transmission. Each frame is divided into several types of subframes according to a CP (Cyclic Prefix) length. A first type subframe includes six OFDMA symbols, a second type subframe includes seven OFDMA symbols, and a third type subframe includes five OFDMA symbols. The frame may be applied to TDD (Time Division Duplexing), FDD (Frequency Division Duplexing), and H-FDD (Half-FDD).

In TDD, each subframe is used for uplink or downlink in the same frequency at different point of times. That is, subframes within a TDD frame are divided into uplink subframes and downlink subframes in the time domain.

TTG (Transmit/receive Transition Gap)/RTG (Receive/Transmit transition Gap) (i.e., an idle time for transition from the uplink to the downlink or transition from the downlink to the uplink) is placed between the downlink subframe and the uplink subframe. The TTG/RTG is also called a switching point or an idle frame.

The SFH may be placed in a first subframe of the superframe and may include a broadcast channel. Essential system parameters and system setting information are transmitted via the SFH. The SFH is multiplexed with an A-MAP (Advanced MAP) using TDM (Time Division Multiplexing) scheme. The SFH is transmitted within a predefined frequency partition called an SFH frequency partition. The SFH frequency partition includes NPRU, SFH PRUs within a 5 MHz physical band. In the SFH frequency partition, the PRUs use 2 stream pilot patterns. In the SFH frequency partition, the PRUs are permuted for NPRU, SFH DLRU (Distributed Logical Resource Unit). The SFH is divided into a P-SFH (Primary SFH) and an S-SFH (Secondary SFH).

The following Table 1 lists parameters and values for resource allocation of the SFH.

TABLE 1

| Parameters | Description | Value |
|---|---|---|
| $N_{DLRU,SFH}$ | The number of distributed LRUs which are occupied by SFH. Note that $N_{DLRU,SFH} = N_{DLRU,P-SFH} + N_{DLRU,S-SFH}$ | TBD (<=24 (i.e. 5 MHz)) |
| $N_{DLRU,P-SFH}$ | The number of distributed LRUs which are occupied by P-SFH | Fixed (value is TBD) |
| $N_{DLRU,S-SFH}$ | The number of distributed LRUs which are occupied by S-SFH | Variable (maximum value is TBD) |

Assuming that $N_{DLRU,SFH}$ is less than 24, other DLRUs of an SFH frequency partition are allocated for data or other control transmission. The P-SFH shall be transmitted in every superframe. The first $N_{DLRU,P-SFH}$ DLRUs of the SFH frequency partition are allocated for P-SFH. The $N_{DLRU,P-SFH}$ is a fixed value. The S-SFH may be transmitted in every superframes. If the S-SFH is present, the S-SFH shall be mapped to the $N_{DLRU,S-SFH}$ DLRUs following the $N_{DLRU,P-SFH}$ DLRUs. The Information transmitted in the S-SFH is divided into different sub-packets.

The following Table 2 lists the OFDMA (Orthogonal Frequency Division Multiple Access) parameters of the IEEE 802.16m system.

TABLE 2

| | | 5 | 7 | 8.75 | 10 | 20 |
|---|---|---|---|---|---|---|
| The nominal channel bandwidth, BW (MHz) | | 5 | 7 | 8.75 | 10 | 20 |
| Sampling factor, n | | 28/25 | 8/7 | 8/7 | 28/25 | 28/25 |
| Sampling frequency, $F_s$ (MHz) | | 5.6 | 8 | 10 | 11.2 | 22.4 |
| FFT size, $N_{FFT}$ | | 512 | 1024 | 1024 | 1024 | 2048 |
| Subcarrier spacing, $\Delta f$ (kHz) | | 10.94 | 7.81 | 9.77 | 10.94 | 10.94 |
| Useful symbol time, $T_b$ (μs) | | 91.4 | 128 | 102.4 | 91.4 | 91.4 |
| CP ratio, G = ⅛ | OFDMA symbol time, $T_s$ (μs) | 102.857 | 144 | 115.2 | 102.857 | 102.857 |
| | FDD Number of OFDMA symbols per 5 ms frame | 48 | 34 | 43 | 48 | 48 |
| | Idle time (μs) | 62.857 | 104 | 46.40 | 62.857 | 62.857 |
| | TDD Number of OFDMA symbols per 5 ms frame | 47 | 33 | 42 | 47 | 47 |
| | TTG + RTG (μs) | 165.714 | 248 | 161.6 | 165.714 | 165.714 |
| CP ratio, G = 1/16 | OFDMA symbol time, $T_s$ (μs) | 97.143 | 136 | 108.8 | 97.143 | 97.143 |
| | FDD Number of OFDMA symbols per 5 ms frame | 51 | 36 | 45 | 51 | 51 |
| | Idle time (μs) | 45.71 | 104 | 104 | 45.71 | 45.71 |
| | TDD Number of OFDMA symbols per 5 ms frame | 50 | 35 | 44 | 50 | 50 |
| | TTG + RTG (μs) | 142.853 | 240 | 212.8 | 142.853 | 142.853 |
| CP ratio, G = ¼ | OFDMA symbol time, $T_s$ (μs) | 114.286 | | | 114.286 | 114.286 |
| | FDD Number of OFDMA symbols per 5 ms frame | 42 | | | 42 | 42 |
| | Idle time (μs) | 199.98 | | | 199.98 | 199.98 |
| | TDD Number of OFDMA symbols per 5 ms frame | 42 | | | 42 | 42 |
| | TTG + RTG (μs) | 199.98 | | | 199.98 | 199.98 |
| Number of Guard Sub-Carriers | Left | 40 | 80 | 80 | 80 | 160 |
| | Right | 39 | 79 | 79 | 79 | 159 |
| Number of Used Sub-Carriers | | 433 | 865 | 865 | 865 | 1729 |
| Number of Physical Resource Blocks (18 × 6) | | 24 | 48 | 48 | 48 | 96 |

Here, the CP is a copy of a useful symbol period which is added to an OFDMA symbol in order to prevent inter-sub-carrier interference and may be represented by a ratio for a useful symbol time (Tu).

Figure 3:
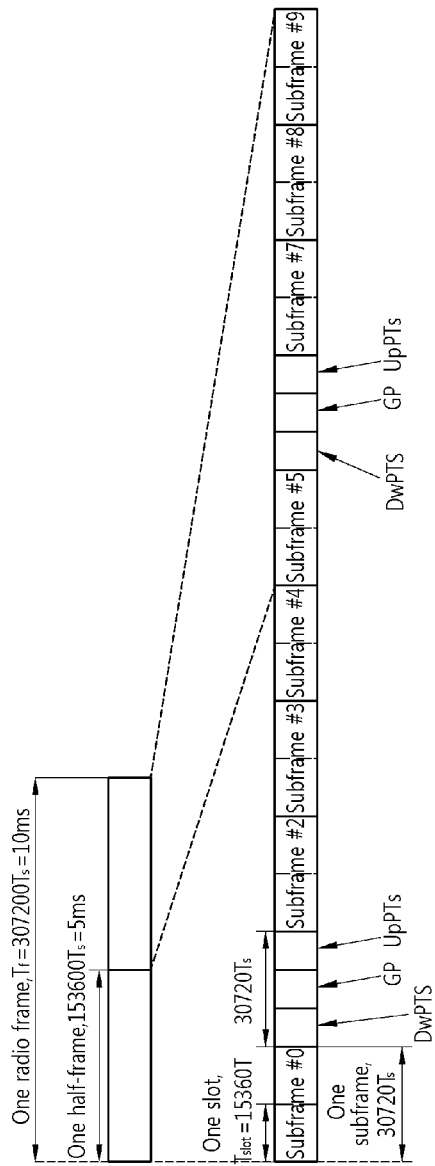
FIG. 3 shows a TDD frame format of a 3GPP LTE system.

FIG. 3 shows a TDD frame format of the 3GPP LTE system. For the TDD frame format, reference can be made to Section 4.2 of 3GPP TS 36.211 V8.2.0 (2008-03) "Technical Specification; Evolved Universal Terrestrial Radio Access (E-UTRA); Physical Channels and Modulation (Release 8)".

Referring to FIG. 3, a radio frame includes two half-frames. Each of the half-frames includes two (subframe #0 to subframe #9) subframes. Each of the subframes may include seven OFDMA symbols in a normal CP and include six OFDMA symbols in an extended CP.

The uplink and the downlink are distinguished on the basis of a subframe. The uplink and the downlink are separated by a switching point. The switching point is an area for separating the uplink and the downlink between the uplink subframe and the downlink subframe. The radio frame includes at least one switching point. The switching point includes a DwPTS (Downlink Pilot Time Slot), a GP (Guard Period), and an UpPTS (Uplink Pilot Time Slot). The DwPTS is used for initial cell search, synchronization, or channel estimation. The UpPTS is used for channel estimation in a base station and uplink transmission synchronization by a user equipment. The GP is a guard period for removing interference caused in the uplink because of multi-path delay of a downlink signal between the uplink and the downlink.

Table 3 lists the format of a frame which can be set depending on the placement of an uplink subframe and a downlink subframe in the LTE TDD system. In Table 3, 'D' indicates a downlink subframe, 'U' indicates an uplink subframe, and 'S' indicates a switching point (i.e., DwPTS+GP+UpPTS).

TABLE 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The configurations 0 to 2, and 6 are ones in which the downlink and the uplink are changed in a switch point periodicity of 5 ms, and the configurations 3 to 5 are ones in which the downlink and the uplink are changed in the switch point periodicity of 10 ms.

Table 4 show a method of configuring DwPTS, GP, and UpPTS which are considered in the LTE system. Ts refers to a sampling time and is calculated as $1/(15000*2048)$ (sec).

TABLE 4

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The normal CP may have nine combinations, and the extended CP may have seven combinations.

For the coexistence of the IEEE 802.16m system and the LTE system, which scheme will be used to set the above-described frame is a problem. This is because, if the uplink transmission period and the downlink transmission period are overlapped with each other in heterogeneous systems, interference may occur. For the coexistence of the IEEE 802.16m and the LTE system, it is necessary to prevent the IEEE 802.16m from performing uplink (or downlink) transmission and the LTE system from performing downlink (or uplink) transmission at the same time.

Figure 4:
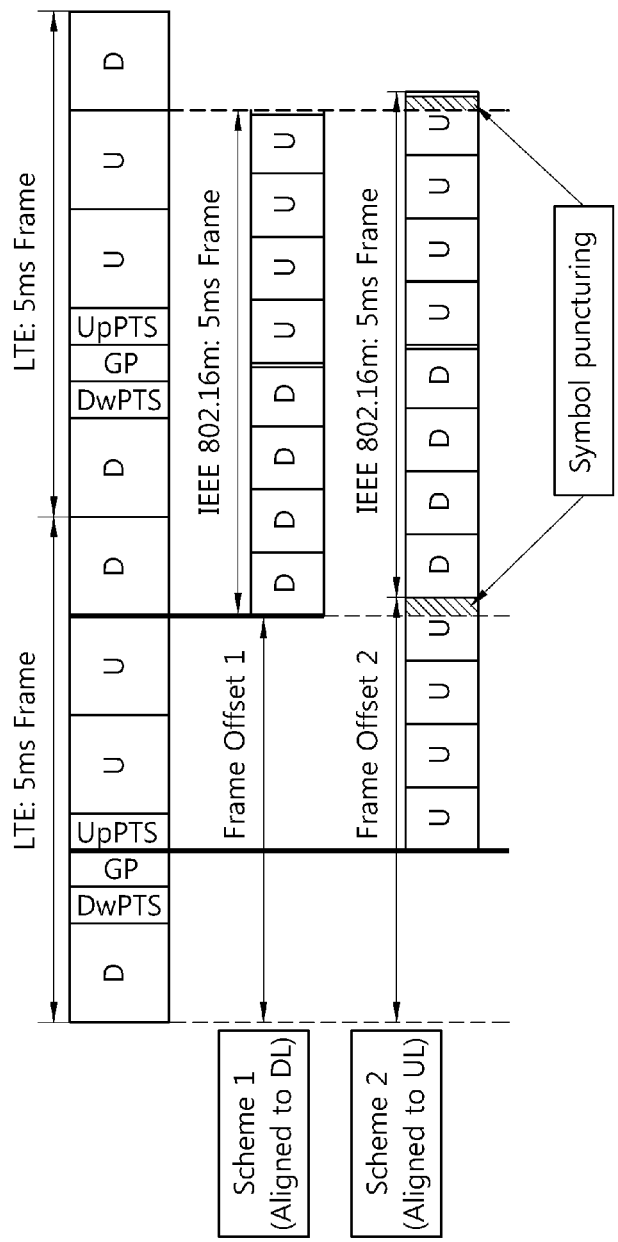
FIG. 4 shows a coexistence method using frame offset.

FIG. 4 shows a coexistence method using a frame offset. For coexistence with a frame having a 5 ms switch point periodicity of the LTE system, a frame offset is applied to the frame of the IEEE 802.16m. The frame offset is used to make the downlink transmission period and the uplink transmission period between the two systems coincide with each other to a maximum extent and to prevent a downlink period and an uplink period from overlapping with each other through puncturing in some periods.

A scheme 1 is used to make the starting point of the downlink of the IEEE 802.16m coincide with the downlink of the LTE frame. In the scheme 1, a time interval between the frames of the two systems is defined as a frame offset 1. A scheme 2 is used to make the starting point of the uplink of the IEEE 802.16m coincide with the uplink of the LTE frame. For example, the starting point of the uplink of the IEEE 802.16m may coincide with the starting point of the UpPTS or GP of the LTE frame. A frame offset 2 indicates a time interval between the frames of the two systems. This time interval may be defined on a subframe unit or OFDMA-symbol unit. Puncturing OFDMA symbol may be required in some periods because of a difference between the OFDMA parameter of the IEEE 802.16m and the OFDMA parameter of the LTE system. The scheme 1 and the scheme 2 may be used independently, in combination, or selectively, if appropriate.

Figure 5:
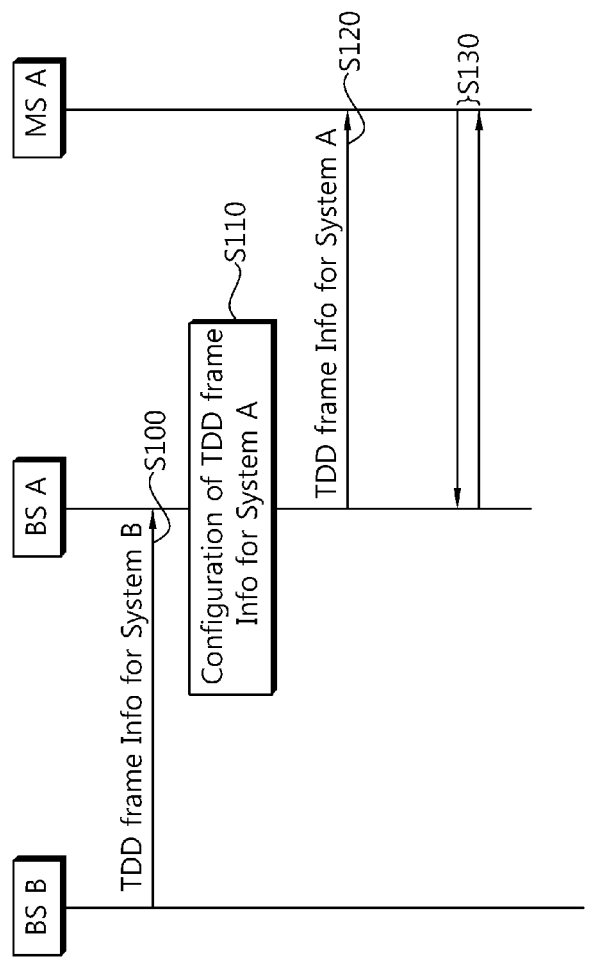
FIG. 5 is a flowchart showing a communication method according to an embodiment of the present invention.

FIG. 5 is a flowchart showing a method of performing communication according to an embodiment of the present invention. A system A may be an IEEE 802.16m system, and a system B may be a LTE system. It is hereinafter assumed that an IEEE 802.16m base station is a base station A, an IEEE 802.16m user equipment is a user equipment A, a LTE base station is a base station B, and a LTE user equipment is a user equipment B, for convenience of description.

Referring to FIG. 5, the base station A receives, from the base station B, a TDD frame information of the system B (S100). The TDD frame information of the system B may be included in system information. The TDD frame of the system B may have a variety of CP lengths and have a variety of DL/UL ratios according to the respective CP lengths. The base station A may receive, from the base station B, information for a CP length and a DL/UL ratio according to the CP length of the TDD frame which is now being used. Table 5 lists CP lengths and DL/UL ratios according to the CP lengths which the TDD frame of the system B may have.

TABLE 5

| Configuration | CP length | DL/UL ratio |
|---|---|---|
| 0 | ¼ Tu | D1:U1, D2:U2, D3:U3, D4:U4 |
| 1 | ⅛ Tu | D2:U2, D3:U3, D4:U4, D5:U5 |
| 2 | 1/16 Tu | D3:U3, D4:U4, D5:U5, D6:U6 |
| 3 | 1/32 Tu | D4:U4, D5:U5, D6:U6, D7:U7 |
| ... | ... | ... |

The CP lengths listed in Table 5 are only illustrative, and the CP length may have various lengths besides ¼Tu, ⅛Tu, 1/16Tu, and 1/32Tu. Further, the DL/UL ratio may have various ratios. For example, the DL/UL ratio may be 1:3, 2:2, 3:5, 5:3, 7:1, 8:0, etc., but not limited thereto. The DL/UL ratio may vary depending on each CP length.

The base station A configures a TDD frame configuration information of the system A based on the TDD frame information of the system B received from the base station B (S110). The TDD frame configuration information of the system A may include information on a frame offset, a DL/UL ratio, and punctured symbol of the TDD frame of the system A. The information on punctured symbol may include the position, number, etc. of the punctured symbol.

The base station A transmits, to the user equipment A, the TDD frame configuration information of the system A (S120). The TDD frame configuration information of the system A, which is transmitted from the base station A to the user equipment A, may include information on a DL/UL ratio and punctured symbol of the TDD frame of the system A. The information on punctured symbol may include the position, number, etc. of the punctured symbol.

The user equipment A operates based on the TDD frame configuration information of the system A (S130).

Figure 6:
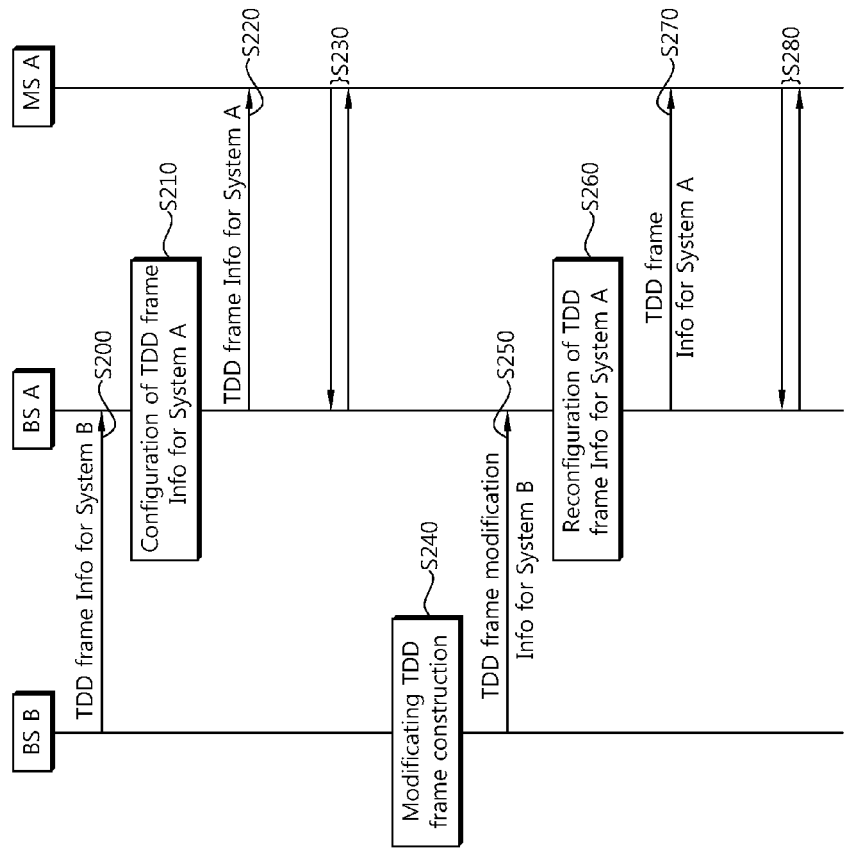
FIG. 6 is a flowchart showing a communication method according to another embodiment of the present invention.

FIG. 6 is a flowchart showing a method of performing communication according to another embodiment of the present invention.

A system A may be an IEEE 802.16m system, and a system B may be a LTE system. It is assumed that an IEEE 802.16m base station is a base station A, an IEEE 802.16m user equipment is a user equipment A, a LTE base station is a base station B, and a LTE user equipment is a user equipment B, for convenience of description.

Referring to FIG. 6, the base station A receives, from the base station B, a TDD frame information of the system B which is now being used (S200). The base station A configures a TDD frame configuration information of the system A based on the TDD frame information of the system B received from the base station B (S210), and transmits, to the user equipment A, the TDD frame configuration information of the system A (S220). The user equipment A operates based on the TDD frame configuration information of the system A (S230).

The system B may modify the configuration of the TDD frame (S240). For example, the system B may modify the CP length or the DL/UL ratio of the TDD frame.

The base station A receives, from the base station B, TDD frame configuration modification information of the system B (S250). The TDD frame configuration modification information of the system B may include an index for a modified CP length or an index for a modified DL/UL ratio or both.

The base station A reconfigures the TDD frame configuration information of the system A based on the TDD frame configuration modification information of the system B (S260) and retransmits, to the user equipment A, the reconfigured TDD frame configuration information of the system A (S270). The user equipment A operates based on the reconfigured TDD frame configuration information of the system A (S280).

In the case where the TDD frame configuration of the system B is dynamically modified, the system B may transmit TDD frame configuration modification information of the system B to the system A periodically or non-periodically. For example, the TDD frame configuration modification information of the system B may be transmitted on multiple of subframe, on multiple of switching point, or on multiple of frame. Alternatively, the TDD frame configuration modification information of the system B may be transmitted using an event-trigger scheme. In this case, the TDD frame configuration modification information of the system B may include a modification for a CP length or a DL/UL ratio. Further, the system B and the system A may share the TDD frame configuration modification pattern of the system B.

A method of configuring the IEEE 802.16m TDD frame and a method of transmitting the TDD frame configuration information are described below.

The following Table 6 lists a summary of the DL/UL ratios of an IEEE 802.16m TDD frame and the number of punctured symbols according to three kinds of DL/UL ratios having a 5 ms periodicity of a LTE TDD frame. A scheme 1 and a scheme 2 correspond to the scheme 1 and the scheme 2 of FIG. 4, respectively.

TABLE 6

| | 1:3 | | 2:2 | | 3:1 | |
|---|---|---|---|---|---|---|
| | DL/UL ratio for 802.16m TDD in 5 ms frame, Punctured symbols in 5 ms frame | | | | | |
| | Scheme 1 (Aligned to DL) | Scheme 2 (Aligned to UL) | Scheme 1 (Aligned to DL) | Scheme 2 (Aligned to UL) | Scheme 1 (Aligned to DL) | Scheme 2 (Aligned to UL) |
| Normal CP | | | | | | |
| 0 | 2:6 or 3:5, none | 3:5, one | 4:4, none | 3:5, three | 6:2, none | 5:3, one |
| 1 | 3:5, none | 3:5, one | 5:3, one | 4:4, two | 6:2, none | 6:2, none |
| 2 | 3:5, none | 3:5, one | 5:3, one | 4:4, two | 6:2, none | 6:2, none |
| 3 | 3:5, none | 3:5, one | 5:3, one | 4:4, three | 7:1, three | 6:2, one |
| 4 | 3:5, none | 3:5, one | 5:3, one | 4:4, four | 7:1, three | 6:2, one |
| 5 | 2:6 or 3:5, none | 3:5, none | 4:4, none | 3:5, three | 6:2, none | 5:3, one |
| 6 | 3:5, none | 3:5, none | 5:3, two | 4:4, two | 6:2, none | 6:2, none |
| 7 | 3:5, none | 3:5, none | 5:3, two | 4:4, two | 6:2, none | 6:2, none |
| 8 | 3:5, none | 3:5, none | 5:3, two | 4:4, three | 7:1, four | 6:2, one |
| Extended CP | | | | | | |
| 0 | 3:5, none | 3:5, one | 4:4, none | 3:5, four | 6:2, none | 5:3, one |
| 1 | 3:5, none | 3:5, one | 5:3, one | 4:4, two | 7:1, none | 6:2, none |
| 2 | 3:5, none | 3:5, one | 5:3, one | 4:4, three | 6:2 or 7:1, none | 6:2, none |
| 3 | 3:5, none | 3:5, one | 5:3, one | 4:4, three | 7:1, none | 6:2, one |
| 4 | 3:5, none | 3:5, none | 4:4, none | 3:5, four | 7:1, none | 5:3, one |
| 5 | 3:5, none | 3:5, none | 5:3, two | 4:4, two | 6:2, none | 6:2, none |
| 6 | 3:5, none | 3:5, none | 5:3, two | 4:4, three | 7:1, four | 6:2, none |

An IEEE 802.16m base station transmits a IEEE 802.16m TDD frame configuration information to an IEEE 802.16m user equipment. The IEEE 802.16m TDD frame configuration information may include information on a DL/UL ratio and a punctured symbol.

Various DL/UL ratios of the IEEE 802.16m TDD frame may be shared between a user equipment and a base station, and the base station may transmit an index for a corresponding DL/UL ratio. For example, in the case where information "an index 1 is DL:UL=3:5", "an index 2 is DL:UL=4:4", and "an index 3 is DL:UL=5:3" are shared between the user equipment and the base station and the base station indicates the index 1 for the user equipment, the user equipment may configure the DL/UL ratio of the TDD frame into 3:5. The DL/UL ratio of the TDD frame may be dependent on a CP length.

The information on punctured symbol may include the position of the punctured symbol and the number of punctured symbols. The position of the punctured symbol may be represented on a downlink or uplink unit, on a subframe unit, or on an OFDMA-symbol unit. For example, in the case where an OFDMA symbol is punctured in the downlink, it may be indicated by "0." In the case where an OFDMA symbol is punctured in the uplink, it may be indicated by "1." Further, in the case where an OFDMA symbol within a specific subframe is punctured, it may be indicated by a bit stream corresponding to the specific subframe.

The position of the puncturing symbol may be in detail indicated by a specific OFDMA symbol. If the position of the puncturing symbol is not indicated by a specific OFDMA symbol, the first OFDMA symbol or the last OFDMA symbol of the uplink or the downlink may be punctured by default. Alternatively, the first OFAMA symbol or the last OFDMA symbol of a specific subframe may be punctured by default.

The number of punctured symbols may be indicated by a bit stream. For example, in Table 6, the number of punctured symbols may be indicated by 3 bits because it may be 0 to 4.

When the number of punctured symbols is more than certain number, more than one subframes may be concatenated. In this case, information on the concatenation of the subframes may be newly defined within IEEE 802.16m TDD frame configuration information for the purpose of coexistence with the LTE system. Alternatively, information on the concatenation of subframes may be added to the existing information. The base station may transmit information on the concatenation of subframes to the user equipment. For example, the base station may indicate whether a punctured subframe is concatenated with a neighboring subframe as 1 bit information.

When an IEEE 802.16m user equipment initially enters a network, the IEEE 802.16m base station may transmit TDD frame configuration information to the IEEE 802.16m user equipment. However, the configuration of a LTE TDD frame may be variable. Accordingly, if the configuration of the LTE TDD frame is modified after the IEEE 802.16m user equipment has entered the network, the configuration of the IEEE 802.16m TDD frame must be also reconfigured. In this case, the IEEE 802.16m base station may transmit a reconfigured TDD frame configuration information to the IEEE 802.16m user equipment. In the case where the LTE TDD frame is variable, the IEEE 802.16m base station may transmit a TDD frame configuration index to the IEEE 802.16m user equipment. Alternatively, the IEEE 802.16m base station may transmit information on the periodicity of the TDD frame and the TDD frame configuration index in each periodicity. The TDD frame configuration index may be defined to include a CP length, the position of an SFH, and a frame offset.

The base station may transmit TDD frame configuration information to the user equipment via a control channel. For example, the control channel may be an SFH, a broadcast channel, or the control channel header of a subframe. In addition, the base station may transmit TDD frame configuration information to the user equipment via a place where general control information is located within a frame.

It is hereinafter considered that an IEEE 802.16m TDD frame coexists with a LTE TDD frame having a greater repetition periodicity.

Each of the configurations 3 to 6 (refer to Table 3) of the LTE TDD frame has a repetition periodicity of 10 ms, and the IEEE 802.16m has a repetition periodicity of 5 ms. Accordingly, in the IEEE 802.16m TDD frame, the DL/UL ratio of an even frame may be a:b, the number of punctured symbols of the frame may be n, the DL/UL ratio of an odd frame may be c:d, and the number of punctured symbols of the frame may be m. In the case where TDD frame configuration information is transmitted to the IEEE 802.16m user equipment, the IEEE 802.16m base station may transmit the DL/UL ratio and the number of punctured symbols of the even frame, the DL/UL ratio and the number of punctured symbols of the odd frame to the IEEE 802.16m user equipment.

The subframes 5 to 9 of the configurations 3 to 5 of the LTE TDD frame are downlink subframes. Accordingly, the IEEE 802.16m base station may indicate to the IEEE 802.16m user equipment that the DL/UL ratio of the even (or odd) frame of an IEEE 802.16m TDD frame is 8:0. Alternatively, the IEEE 802.16m base station may indicate to the IEEE 802.16m user equipment that subframes included in an even (or odd) frame has to be set by only a downlink subframe.

When the LTE TDD frame is any one of the configurations 3 to 6, the IEEE 802.16m TDD frame may be set to have a 10 ms periodicity. Accordingly, when the LTE TDD frames is the configuration 3, 4, or 5, the DL/UL ratio of the IEEE 802.16m TDD frame may be set to 6:3, 7:2, or 8:1. The IEEE 802.16m base station may indicate the DL/UL ratios to the IEEE 802.16m user equipment.

The method of configuring a TDD frame so that the LTE system and the IEEE 802.16m system may coexist and the method of transmitting TDD frame configuration information have been described above. It is, however, to be noted that the methods are only illustrative, for convenience of description, and may be applied to other heterogeneous systems. For example, the present invention may be applied for the coexistence of an LCR (Low Chip Rate) system and an IEEE 802.16m system. In this case, the LCR system may represent a first system and the IEEE 802.16m system may represent a second system, for convenience of description.

Figure 7:
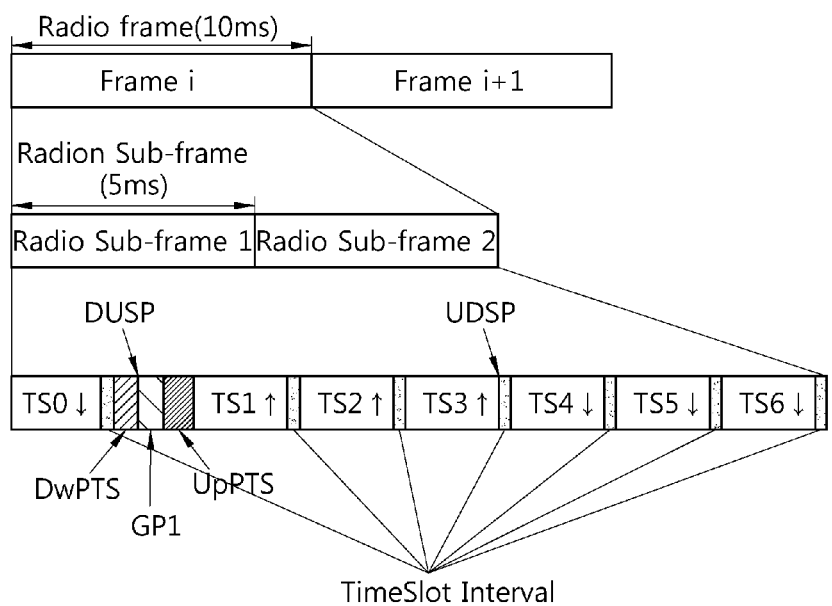
FIG. 7 shows an example of a LCR TDD frame (1.28 Mcps) format.

FIG. 7 shows an example of an LCR TDD frame (1.28 Mcps) format. This drawing illustrates that a ratio of downlink to uplink (hereinafter, referred to as a 'DL/UL ratio) is 4:3. In addition, the DL/UL ratio may be 6:1, 5:2 or the like.

Referring to FIG. 7, one radio frame includes two radio subframes. The length of each radio frame is 10 ms, and the length of each radio subframe is 5 ms. One radio subframe includes 7 traffic slots (TS), and the length of each traffic slot is 0.675 ms. A downlink pilot time slot (DwPTS), a guard period (GP), and an uplink pilot time slot (UpPTS) are placed between the TS0 and the TS1. The length of the DwPTS is 75 μs, the length of the GP is 75 μs, and the length of the UpPTS is 125 μs. The DwPTS and UpPTS are used for downlink synchronization and uplink synchronization. ↓ refers to a downlink traffic slot, and ↑ refers to an uplink traffic slot. A switching point from the downlink to the uplink (a downlink to uplink switching point, DUSP) is placed between the S0 and the TS1, and a switching point from the uplink to the downlink (an uplink to downlink switching point, UDSP) is placed between the TS3 and the TS4.

The following Table 7 shows a summary of the DL/UL ratios of an IEEE 802.16m TDD frame and the number of puncturing symbols according to three kinds of DL/UL ratios of an LCR TDD frame.

TABLE 7

LCR-TDD DL/UL ratios

| | 4:3 | | 5:2 | | 6:1 | |
|---|---|---|---|---|---|---|
| | | | DL/UL ratio for 802.16m TDD in 5 ms frame, Punctured symbols in 5 ms frame | | | |
| | Scheme1 (Align to DL) | Scheme1 (Align to UL) | Scheme1 (Align to DL) | Scheme1 (Align to UL) | Scheme1 (Align to DL) | Scheme1 (Align to UL) |
| Conf | 5:3 Three | 4:4 Three | 6:2 Two | 5:3 Three | 7:1 One | 6:2 Four |

A scheme 1 is used to make the starting point of the downlink of the IEEE 802.16m frame coincide with the downlink of the LCR frame. A scheme 2 is used to make the starting point of the uplink of the IEEE 802.16m frame coincide with the uplink of the LCR frame. For example, the starting point of the uplink of the IEEE 802.16m frame may be set to the starting point of the UpPTS or GP of the LCR frame.

An LCR base station transmits the DL/UL ratio of the LCR TDD frame to an IEEE 802.16m base station, and an IEEE 802.16m base station configures IEEE 802.16m TDD frame configuration information based on the DL/UL ratio of the LCR TDD frame and Table 7. The IEEE 802.16m base station may configures a TDD frame by sharing the IEEE 802.16m TDD frame configuration information with an IEEE 802.16m user equipment and may communicate using the TDD frame.

Figure 8:
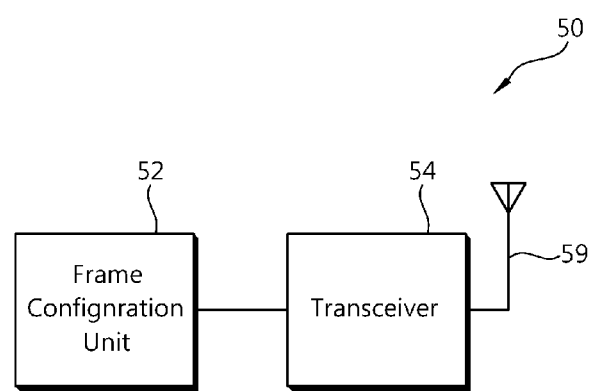
FIG. 8 shows an apparatus for wireless communication according to an embodiment of the present invention.

FIG. 8 shows an apparatus for wireless communication according to an embodiment of the present invention. The apparatus for wireless communication may be part of a user equipment or part of a base station. The apparatus 50 for wireless communication includes a frame configuration unit 52, a transceiver 54, and an antenna 59.

The frame configuration unit 52 configures a TDD frame for coexistence with other networks based on frame configuration information, and the transceiver 54 transmits and receives a TDD frame.

The present invention may be implemented using hardware or software or a combination of them. In hardware implementation, the present invention may be implemented using an ASIC (Application Specific Integrated Circuit), DSP (Digital Signal Processing), a PLD (Programmable Logic Device), a FPGA (Field Programmable Gate Array), a processor, a controller, a micro-processor, or other electronic unit or a combination of them which are designed to implement the above functions. In software implementation, the present invention may be implemented using a module for performing the above functions. Software may be stored in a memory unit and is executed by a processor. A variety means well known to those skilled in the art may be used as the memory unit or the processor. While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of performing communication using a TDD (Time Division Duplex) mode, the method comprising:
   receiving, from a second system, TDD frame configuration information of the second system, which comprises information on punctured symbol, the information on punctured symbol to be obtained based on TDD frame configuration information of a first system; and
   operating based on the received TDD frame configuration information of the second system.

2. The method of claim 1, wherein the information on punctured symbol comprises information on position and number of punctured OFDMA symbols among a plurality of OFDMA symbols constituting a downlink subframe or an uplink subframe.

3. The method of claim 1, wherein the TDD frame configuration information further comprises information on a ratio of downlink subframes to uplink subframes within a TDD frame.

4. The method of claim 1, wherein the TDD frame configuration information of the second system is received via a control channel.

5. The method of claim 4, wherein the control channel is a SFH (Superframe Header).

6. A method of performing communication using a TDD (Time Division Duplex) mode, the method comprising:
   obtaining, from a first system, TDD frame information of the first system:
   configuring TDD frame configuration information of a second system, which comprises information on punctured symbol based on the obtained TDD frame information of the first system; and
   transmitting, to a user equipment, the TDD frame configuration information of the second system.

7. The method of claim 6, further comprising:
   obtaining, from the first system, the TDD frame configuration modification information of the first system;
   reconfiguring the TDD frame configuration information of the second system based on the obtained TDD frame configuration modification information of the first system; and
   transmitting, to the user equipment, the reconfigured TDD frame configuration information of the second system.

8. The method of claim 7, wherein the TDD frame configuration modification information of the first system comprises information on a CP (Cyclic Prefix) length of a TDD frame of the first system, or information on a ratio of a downlink domain to an uplink domain.

9. The method of claim 6, wherein:
   the first system is a 3GPP (3rd Generation Partnership Project) LTE (Long Term Evolution) system or a LCR (Low Chip Rate) system, and
   the second system is an IEEE (Institute of Electrical and Electronics Engineers) 802.16m system.

* * * * *